(12) United States Patent
Yu et al.

(10) Patent No.: US 11,221,617 B2
(45) Date of Patent: Jan. 11, 2022

(54) GRAPH-BASED PREDICTIVE MAINTENANCE

(71) Applicant: NEC Laboratories America, Inc., Princeton, NJ (US)

(72) Inventors: Wenchao Yu, Plainsboro, NJ (US); Jingchao Ni, Princeton, NJ (US); Bo Zong, West Windsor, NJ (US); Wei Cheng, Princeton Junction, NJ (US); Haifeng Chen, West Windsor, NJ (US); LuAn Tang, Pennington, NJ (US)

(73) Assignee: NEC Corporation

( * ) Notice: Subject to any disclaimer, the term of this patent is extended or adjusted under 35 U.S.C. 154(b) by 134 days.

(21) Appl. No.: 16/653,033

(22) Filed: Oct. 15, 2019

(65) Prior Publication Data

US 2020/0125083 A1    Apr. 23, 2020

Related U.S. Application Data

(60) Provisional application No. 62/748,572, filed on Oct. 22, 2018.

(51) Int. Cl.
*G05B 23/02* (2006.01)
*G06N 20/10* (2019.01)
(Continued)

(52) U.S. Cl.
CPC ..... *G05B 23/0283* (2013.01); *G06F 16/9024* (2019.01); *G06F 17/18* (2013.01);
(Continued)

(58) Field of Classification Search
CPC .................................................. G05B 23/0283
(Continued)

(56) References Cited

U.S. PATENT DOCUMENTS

| 8,370,280 B1* | 2/2013 | Lin | G06N 20/00 706/12 |
| 2012/0151290 A1* | 6/2012 | Singh | G05B 23/0278 714/741 |

(Continued)

OTHER PUBLICATIONS

Lam, "Neural Network Techniques for Financial Performance Prediction: Integrating Fundamental and Technical Analysis.", Decision Support Systems, Jul. 2003, pp. 567-581.

(Continued)

*Primary Examiner* — Ricky Go
(74) *Attorney, Agent, or Firm* — Joseph Kolodka

(57) ABSTRACT

Systems and methods for predicting system device failure are provided. The method includes performing graph-based predictive maintenance (GBPM) to determine a trained ensemble classification model for detecting maintenance ready components that includes extracted node features and graph features. The method includes constructing, based on testing data and the trained ensemble classification model, an attributed temporal graph and the extracted node features and graph features. The method further includes concatenating the extracted node features and graph features. The method also includes determining, based on the trained ensemble classification model, a list of prediction results of components that are to be scheduled for component maintenance.

6 Claims, 7 Drawing Sheets

(51) Int. Cl.
    *G06F 16/901* (2019.01)
    *G06K 9/62* (2006.01)
    *G06F 17/18* (2006.01)

(52) U.S. Cl.
    CPC ......... *G06K 9/6256* (2013.01); *G06K 9/6267* (2013.01); *G06N 20/10* (2019.01)

(58) Field of Classification Search
    USPC ........................................................ 702/184
    See application file for complete search history.

(56) References Cited

U.S. PATENT DOCUMENTS

2018/0173173 A1* 6/2018 Leonard ............. G05B 23/0283
2019/0251480 A1* 8/2019 Garcia Duran ........ G06N 20/20

OTHER PUBLICATIONS

Cao, "Financial Forecasting Using Support Vector Machines", Neural Computing & Applications 10, No. 2, May 2001, pp. 184-192.
Kim, "Financial Time Series Forecasting Using Support Vector Machines", Neurocomputing 55, No. 102, Mar. 2003, pp. 307-319.
Ravi, "Soft Computing System for Bank Performance Prediction", Applied Soft Computing 8.1, Feb. 2007, pp. 305-315.
Shen, "DRSA-Based Neuro-Fuzzy Inference Systems for the Financial Performance Prediction of Commercial Banks", International Journal of Fuzzy Systems, vol. 16, No. 2, Jun. 2014, pp. 173-183.
Yu, "NetWalk: A Flexible Deep Embedding Approach for Anomaly Detection in Dynamic Networks." Proceedings of the 24th ACM SIGKDD International Conference on Knowledge Discovery & Data Mining, ACM, Jul. 2018, pp. 2672-2681.
Yu, "Link Prediction with Spatial and Temporal Consistency in Dynamic Networks." Proceedings of the International Joint Conference on Artificial Intelligence, Aug. 2017, pp. 3343-3349.
Cheng, "Ranking Causal Anomalies via Temporal and Dynamical Analysis on Vanishing Correlations", In Proceedings of the 22nd ACM SIGKDD International Conference Discovery and Data Mining, ACM, Aug. 2016, pp. 305-814.

* cited by examiner

GRAPH-BASED PREDICTIVE MAINTENANCE

RELATED APPLICATION INFORMATION

This application claims priority to U.S. Provisional Patent Application No. 62/748,572, filed on Oct. 22, 2018, incorporated herein by reference herein its entirety.

BACKGROUND

Technical Field

The present invention relates to deep learning and more particularly to applying deep learning for the detection of entities for maintenance purposes.

Description of the Related Art

Deep learning is a machine learning method based on artificial neural networks. Deep learning architectures can be applied to fields including computer vision, speech recognition, natural language processing, audio recognition, social network filtering, machine translation, bioinformatics, drug design, medical image analysis, material inspection and board game programs, etc. Deep learning can be supervised, semi-supervised or unsupervised.

SUMMARY

According to an aspect of the present invention, a method is provided for predicting system device failure. The method includes performing graph-based predictive maintenance (GBPM) to determine a trained ensemble classification model for detecting maintenance ready components that includes extracted node features and graph features. The method includes constructing, based on testing data and the trained ensemble classification model, an attributed temporal graph and the extracted node features and graph features. The method further includes concatenating the extracted node features and graph features. The method also includes determining, based on the trained ensemble classification model, a list of prediction results of components that are to be scheduled for component maintenance.

According to another aspect of the present invention, a system is provided for predicting system device failure. The system includes a processor device operatively coupled to a memory device, the processor device being configured to perform graph-based predictive maintenance (GBPM) to determine a trained ensemble classification model for detecting maintenance ready components that includes extracted node features and graph features. The processor device also constructs, based on testing data and the trained ensemble classification model, an attributed temporal graph and the extracted node features and graph features. The processor device concatenates the extracted node features and graph features. The processor device further determines, based on the trained ensemble classification model, a list of prediction results of components that are to be scheduled for component maintenance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
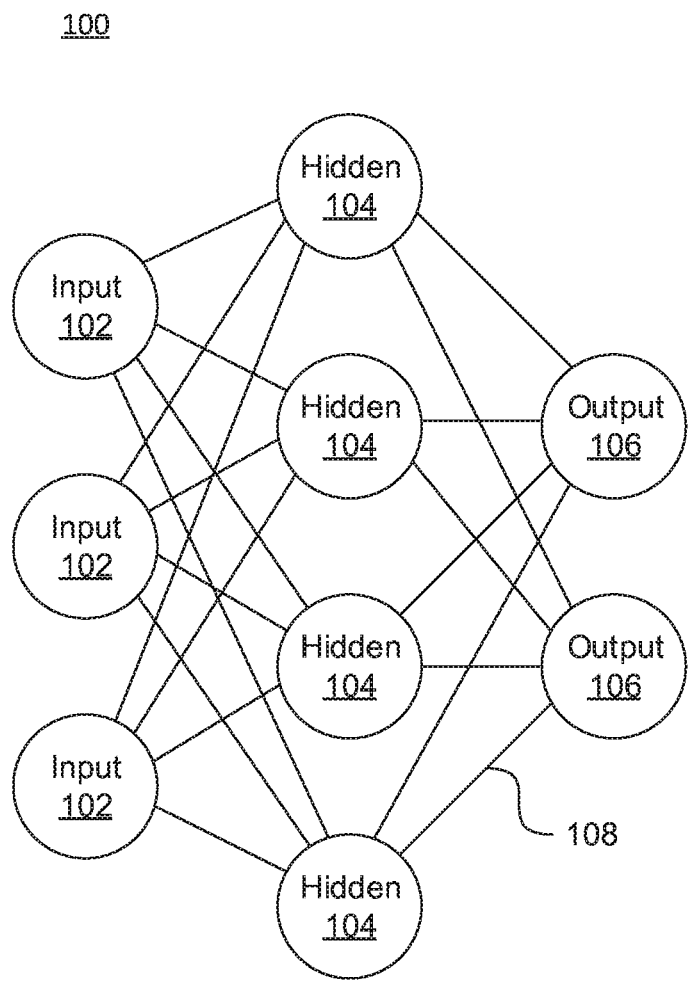
FIG. 1 is a generalized diagram of a neural network, in accordance with an embodiment of the present invention.

In accordance with embodiments of the present invention, systems and methods are provided to/for graph-based predictive maintenance (GBPM) to implement predictive maintenance based on the analysis of attributed temporal graph which is built with the component historical records and profiles.

In one embodiment, GBPM can include 1) graph feature generation and 2) component failure prediction. In the graph feature generation stage, component profiles and historical records are processed as node-based features and graph-based features. In the component failure prediction stage, a trained ensemble classification model can output a list of prediction results which indicate whether a component is expected to require maintenance within a predetermined time. These can include components expected to fail within the predetermined time.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. In example embodiments herein, the training data can include component profiles and historical maintenance records. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
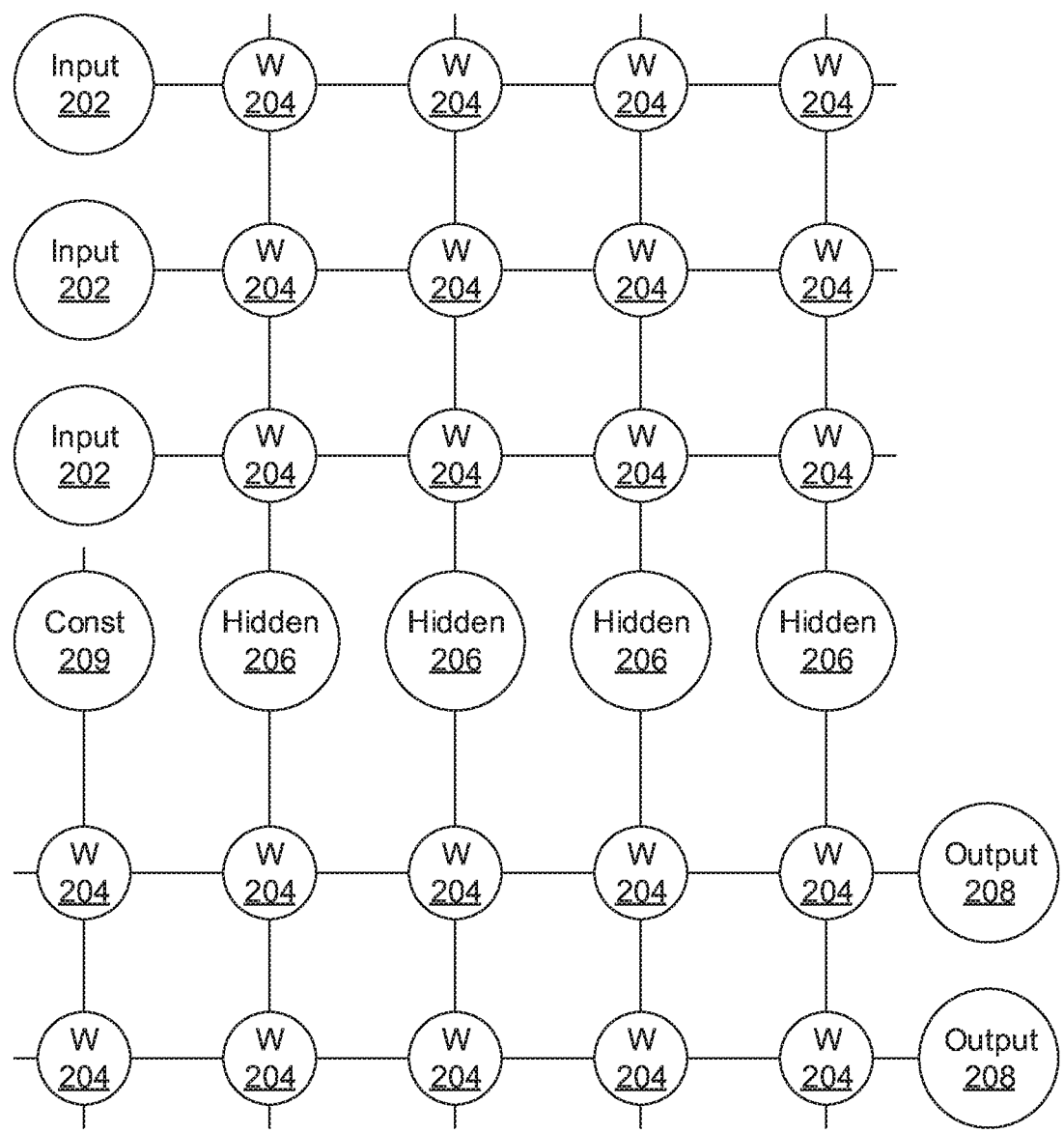
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

The ANN 200 can be applied to implement graph-based predictive maintenance (GBPM) to implement predictive maintenance of devices. ANN 200 can perform GBPM to detect failure components, as described with respect to FIG. 3 and system 300 herein below. The ANN 200 can identify components that are to be scheduled for component maintenance.

Figure 3:
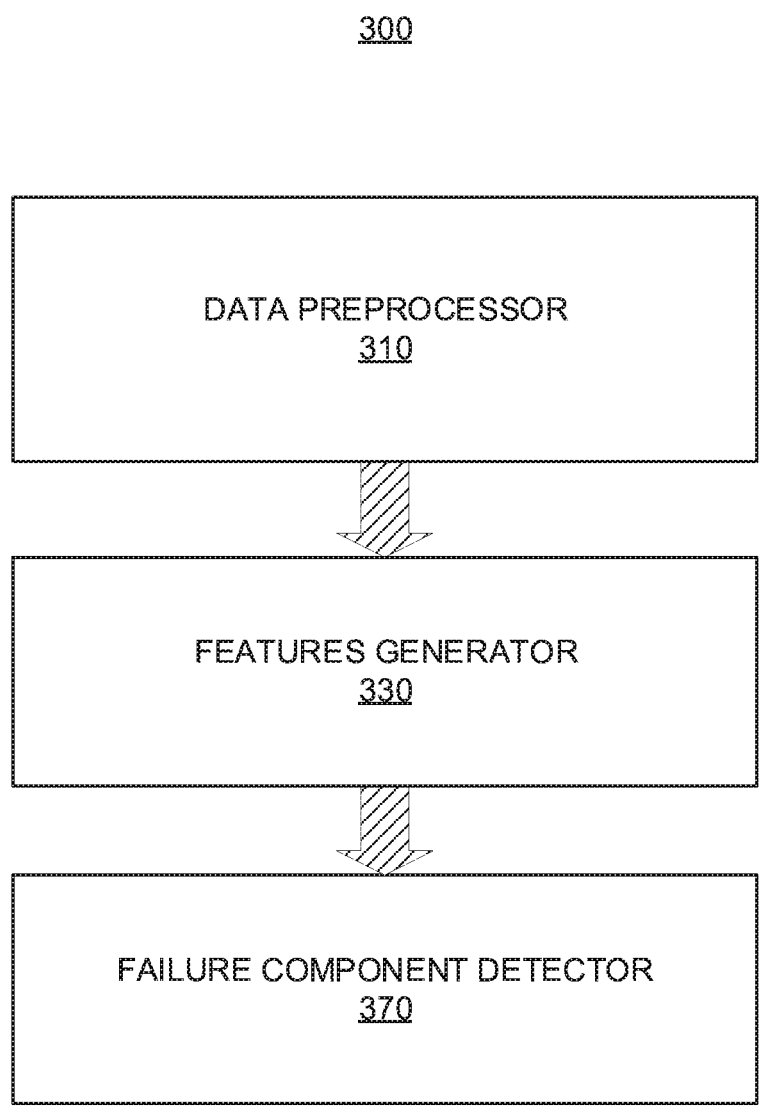
FIG. 3 is a block diagram illustrating a system that implements graph-based predictive maintenance (GBPM) to detect maintenance ready components, in accordance with an embodiment of the present invention.

Referring now to FIG. 3, a block diagram illustrating a system 300 for implementing GBPM to detect failure components, in accordance with example embodiments.

As shown in FIG. 3, system 300 includes a data preprocessor 310, a features generator 330 and a detector 370. System 300 implements a graph-based predictive maintenance framework, GBPM, to address the problem of detecting failure components in the domain of complex system management. Complex systems are known to consist of a great variety of components working together in a highly complex and coordinated manner and influencing each other's lifetime. For example, a cyber-physical system can be equipped with many sensors that record the status of the physical and software components. For system administrators, system 300 provides a capability to identify an optimum moment (for example, to minimize expense, maximize time, and/or properly exploit the lifetime of various components without increasing a risk of failure of that component or other related components above a predetermined threshold) when maintenance should be performed for the components so that the whole system can continue to function reliably (or to maximize output of the entire system and efficiency of usage of maintenance resources). System 300 uses GBPM to quantify the risk of failure for components in the complex systems given components' historical running records and profiles and uses this information to help schedule component maintenance. The historical running records can include mechanical properties, average usage, operating conditions, the amount of data send to or received from other components, etc.

Data preprocessor 310 receives raw data including component historical records with timestamps and profiles such as location information. Data preprocessor 310 processes the information to generate graphs, such as described with respect to FIG. 4 herein below. Data preprocessor 310 formulates the graphs and inputs the graphs to features generator 330.

Features generator 330 generates graph features by processing component profiles and historical records as node-based features and graph-based features, respectively, such as described with respect to FIG. 5 herein below.

Detector 370 is trained and tested with the features from features generator 330, such as described with respect to FIG. 6 herein below. Detector 370 can detect maintenance ready components, such as components that are appropriate to receive maintenance within a predetermined window. Components that are not maintenance ready can include those that are expected to perform above a predetermined level for the duration of the time window. The time window can be selected at a particular instance between or after a scheduled maintenance event to ensure that the component is addressed in a timely manner before issues arise.

System 300 can apply predictive maintenance that can adapt to a large volume of system running logs and component profiles and satisfy timely detection of the components that need to be replaced (or otherwise serviced). In a system with many components working together and influencing each other's lifetime, system, 300 is not limited to predefined types of failure patterns and can generalize to unobserved failures in these complex systems.

Figure 4:
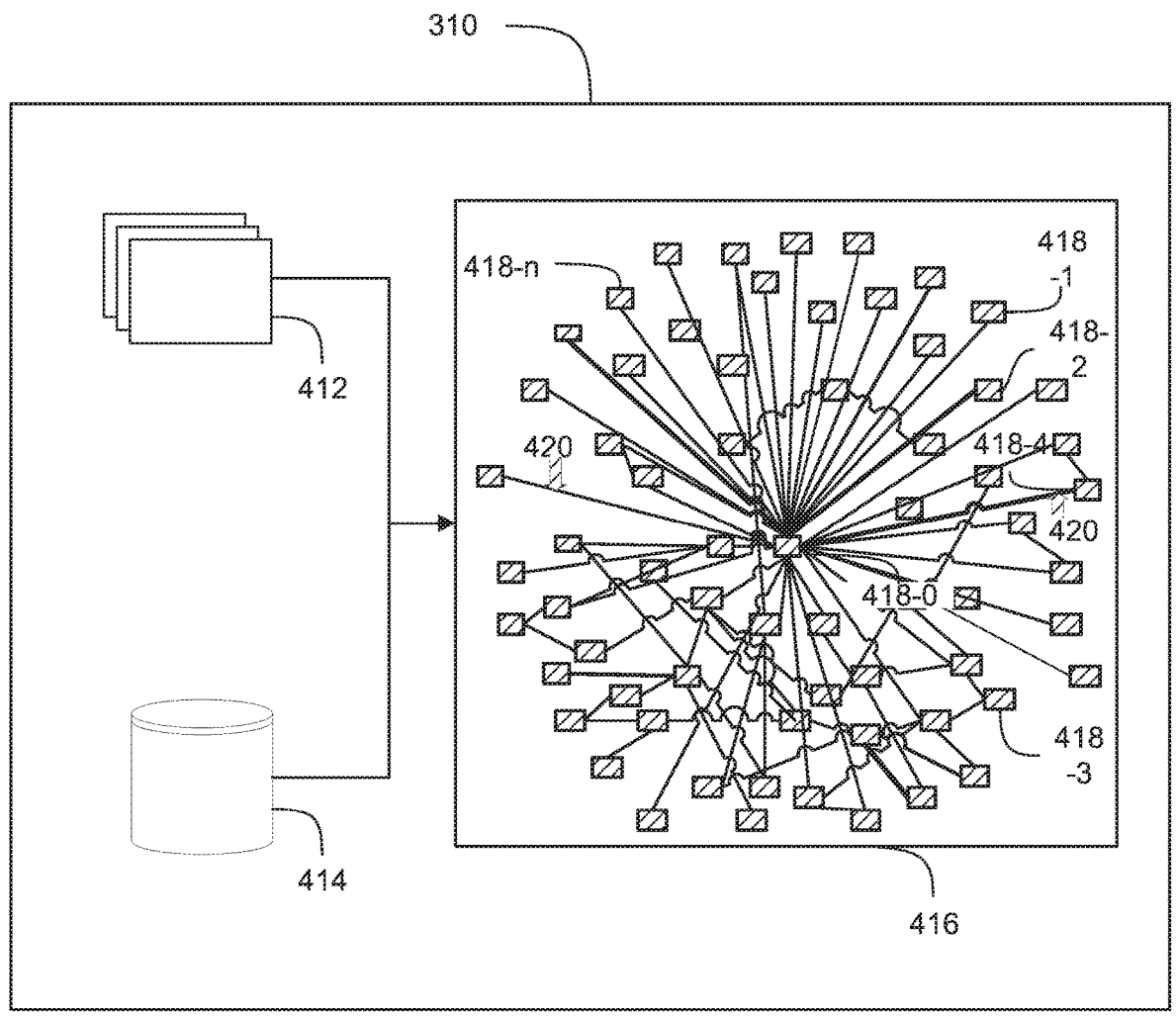
FIG. 4 is a block diagram illustrating a data preprocessor, in accordance with an embodiment of the present invention.

FIG. 4 is a block diagram illustrating components of data preprocessor 310, in accordance with example embodiments.

As shown in FIG. 4, data preprocessor 310 processes component profiles 312 and component historical records 414 (for example, stored in a database) to determine attributed temporal graphs 416. GBPM first models the interactions between different components in a complex system as an attributed temporal graph 416. In this graph 416, each node 418 (shown individually as nodes 418-1 to 418-*n*) is a component, e.g. a device or a sensor, and an edge 420 represents the interaction between components. The edge 420 can be associated with a weight indicating the intensity of the interaction. The weight indicates the amount of data send to or received from other components. In example embodiments, the system 300 can be applied to instances of "virtual communication" between components in which the components are not connected to each other. In these instances, system 300 measures the correlations between components' running logs (time-series data) and uses the correlation scores that are larger than a certain threshold as edge weights to build the graph.

In FIG. 4, by way of illustration, different line thicknesses are shown to illustrate the different weights associated with the intensity of interaction between nodes 418. For example, the line between node 418-0 and 418-4 is illustrated with a greater thickness (i.e., weight) than that between node 418-0 and 418-*n*. Note that a particular number of nodes 418, edges 420 and thicknesses are shown by way of illustration and that any number of nodes 418, edges 420 and thicknesses can be implemented. In example embodiments, data preprocessor 310 can implement Ego networks that consist of a focal node ("ego") and the nodes to whom the ego is directly connected to (which can be referred to as "alters") plus the ties, if any, among the alters.

FIG. 4 illustrates an attributed temporal graph at one timestamp. The attributes of each node 418 are generated from the component profiles such as locations and maintenance records. This graph 416 evolves as the complex systems keep running and generating new component status records. Nodes represent components, and edges represent the interactions between different components. In data preprocessor 310, graphs 416 can be generated in different resolutions, e.g., hourly, daily, weekly, monthly and yearly graphs.

Figure 5:
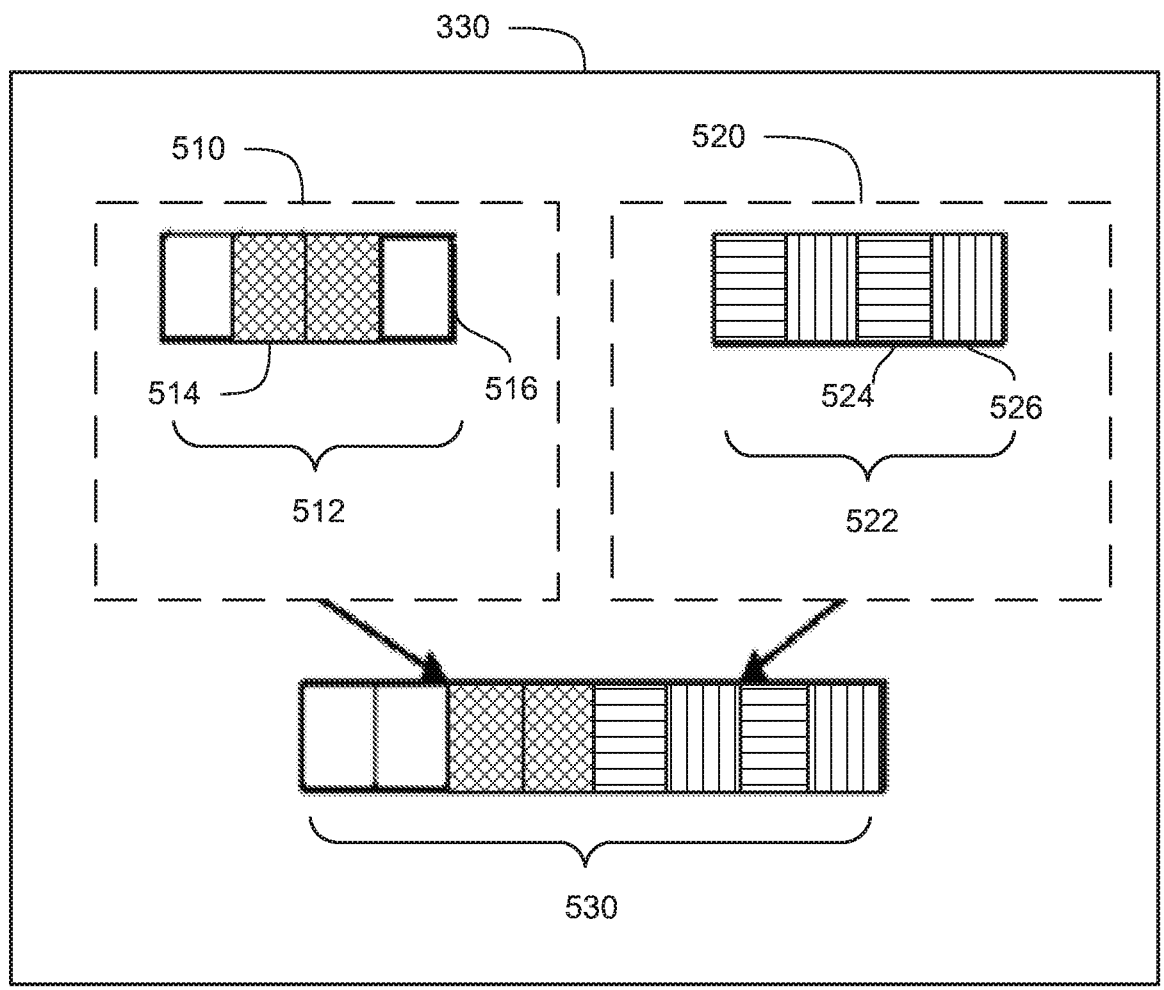
FIG. 5 is a block diagram illustrating a features generator, in accordance with an embodiment of the present invention.

FIG. 5 is a block diagram illustrating components of features generator 330, in accordance with example embodiments.

As shown in FIG. 5, based on the attributed temporal graph 416, features generator 330 can implement GBPM to (for example, automatically) generate features for characterizing the temporal behaviors of components 418 which can be used to identify the failure components. GBPM as described herein includes 1) graph feature generation and 2) component failure prediction. In the graph feature generation stage, features generator 330 processes component profiles 412 and historical records 414 using a node-based features component 510 and graph-based features component 520, respectively. These features can be grouped into two categories, (1) node-based features 512, which are derived from component profiles 412; (2) graph-based features 522, which are derived from the attributed temporal graph 416.

Node-based features component 510 derives node-based features 512 from component profiles 412. These features can be categorized in two groups: static node features 514 and temporal node features 516 (for example, the features that change over time).

For each component (node 418), node-based features component 510 can automatically generate the static node features 514. The static node features are shared across all timestamps, and in example embodiments are only generated at one time.

Node-based features component 510 can derive temporal node features 516 based on a periodic basis, such as each month, quarter, half-year and year. Node-based features component 510 can calculate aggregate statistics including "sum", "maximum", "minimum", "median", "average", "variance" and "length" on temporal features in different resolutions.

Graph-based features component 520 can derive graph-based features 522 from the attributed temporal graph 416. For each component (node 418), the graph-based features component 520 can automatically generate one or more hops features based on the attributed temporal graph 418. The graph-based features 522 can also be categorized into two groups: static graph features 524 and temporal graph features 526, as described below.

The static graph features 524 include one-hop features such as degrees, and multi-hop features. According to example embodiments, these include degree, in-degree, out-degree, in-degree/out-degree, and in-degree minus out-degree. In directed graphs, the number of edges going into a node is referred to as the in-degree of the corresponding node and the number of edges coming out of a node is referred to as the out-degree of the corresponding node. These can also include weighted version of degree features. The features can be based, for example, on 1-hop (one-hop) and 2-hop (two hop) ego net. 1-hop ego net: triangles, density, edges, number of edges entering, number of edges leaving. 2-hop ego net: triangles, density, edges, vertices, # edges enter, # edges leaving. Page rank, betweenness centrality, degree centrality, local clustering coefficient, etc.

Temporal graph features 526 can be derived based on periodic basis, such as per hour, day, week, month, quarter, half-year and year, etc. According to example embodiments, the temporal graph features include eight variables, namely 1) in-degree from attributed temporal graph, 2) total in-degree from attributed temporal graph and dark web (the edges with one node from unknown component), 3) dark web in-degree from unknown components to existing component, 4) out-degree from attributed temporal graph, 5) total out-degree from attributed temporal graph and dark web, 6) dark web out-degree to unknown components to existing components, 7) difference between total in-degree and total out-degree, and 8) proportion between total in-degree and total out-degree. The dark web refers to encrypted online content that is not indexed by conventional search engines. The dark web is a component of the Internet that includes the wider breadth of content that does not appear through regular internet browsing activities. Graph-based features component 520 can calculate the aggregate statistics including "sum", "maximum", "minimum", "median", "average", "variance" and "length" on these eight variables in different resolutions. These statistics of the temporal (vector) features can be used in creating new features based on the temporal features. All the features can then be used by the classifier for maintenance (or failure) component prediction.

Figure 6:
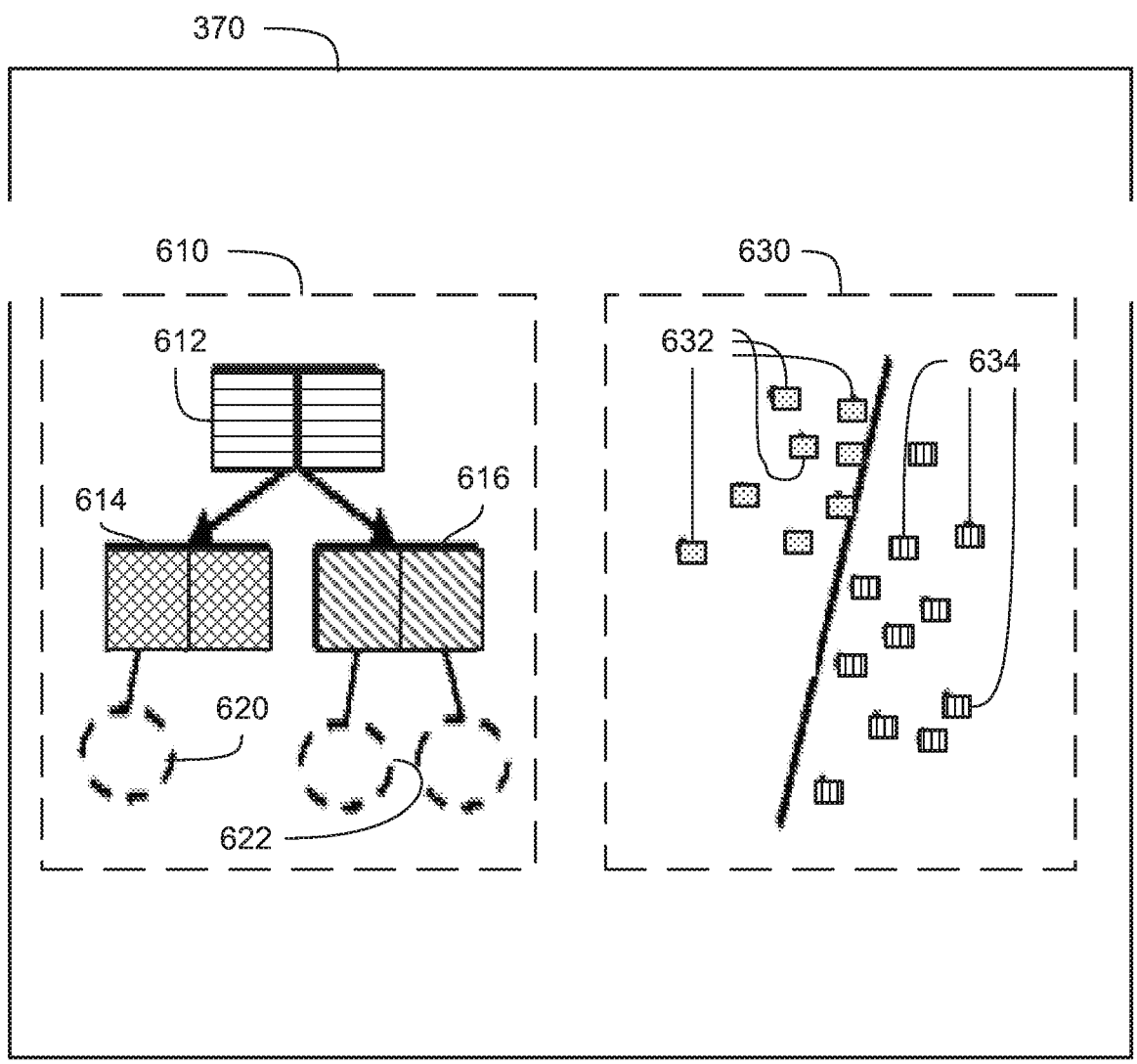
FIG. 6 is a block diagram illustrating a (failure component) detector, in accordance with an embodiment of the present invention.

FIG. 6 is a block diagram illustrating components of detector 370, in accordance with example embodiments.

Detector 370 can access a feature pool based on GBPM for detecting failure components using robust classification models. After feature extraction, detector 370 can be trained and tested with the features from features generator 330. Detector 370 includes an ensemble classification module 610 and a prediction module 630.

According to example embodiments, ensemble classification module 610 utilizes the extracted node features and graph feature for GBPM framework training. ensemble classification module 610 illustrates a tree-based learner with a height of three. In the ensemble classifier, there are many learners (for example, 50, 100, 200, etc.). In example embodiments, ensemble classification module 610 uses ensemble-based classification models such as gradient boosting machines. Ensemble classification module 610 can apply ensemble methodology to build a predictive model by integrating multiple models. The output of ensemble classification module 610 is a trained model that can be used to detect failure components based on provided component historical records and profiles.

Nodes 612, 614, 616 indicate a split of one feature (for example, feature1>threshold1 at 612? If yes, goes to 614, if no, goes to 616). Final decisions 620, 622 are output by the learner. These can include a probability. Ensemble classification module 610 can aggregate all the probabilities from all learners to make the final prediction.

Prediction module 630 illustrates the classification boundary where 632 indicates the components that need to be maintained (maintenance is recommended to be performed) and 634 indicates the normal components (components that do not require maintenance). Prediction module 630 implements an imbalanced classification between the components that need to be maintained 632 and normal components 634.

According to example embodiments, prediction module 630 receives testing data (for example, component historical records and profiles), constructs the attributed temporal graph and extracts node features and graph features for the testing data as described with respect to node-based features component 510 and graph-based features component 520 herein above with respect to FIG. 5. Prediction module 630 then concatenates the learned features and feeds the data to the trained ensemble classification module 610. The output will be a list of prediction results which indicate whether a component will fail or not (or requires maintenance, for example, within a predetermined time window). According to example embodiments, the output can include a list of failure components and corresponding confidence scores.

Figure 7:
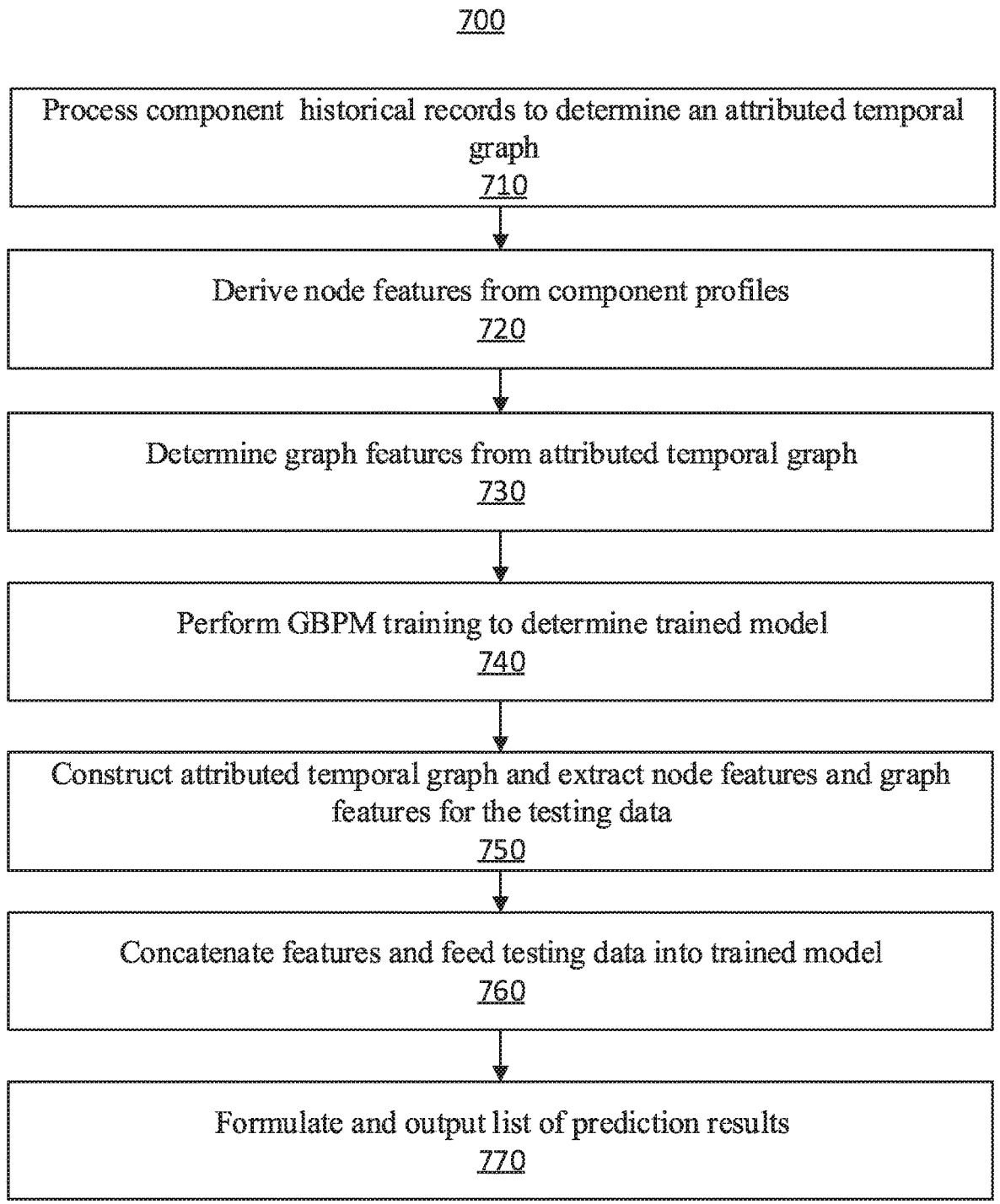
FIG. 7 is a flow diagram illustrating a method of implementing graph-based predictive maintenance (GBPM) to detect maintenance ready components, in accordance with an embodiment of the present invention.

FIG. 7 is a flow diagram illustrating a method 700 of implementing graph-based predictive maintenance (GBPM) to detect failure components, in accordance with the present invention.

At block 710, system 300 receives and processes component profiles and component historical records (for example, associated with one or multiple devices) to determine an attributed temporal graph. A temporal graph is a generalization of a static graph that changes with time. Time can also be modeled as a vertex or edge label, which makes temporal graphs a type of attributed graph.

At block 720, system 300 derives (for example, determines, extracts, etc.) node features from, component profiles. The node features can include static features and temporal features.

At block 730, system 300 determines (for example, extracts, etc.) graph features from the attributed temporal graph. The graph features can include static features and temporal features.

At block 740, system 300 perform GBPM training to determine and output trained ensemble classification model that can detect components to be scheduled for component maintenance (for example, in some instances failure components). For example, system 300 can utilize the extracted node features and graph feature for GBPM framework training. System 300 thereby outputs a trained model that can be used to detect failure components based on component historical records and profiles.

At block 750, system 300 receives testing data (for example, component historical records and profiles), constructs the attributed temporal graph and extracts node features and graph features for the testing data.

System 300 then concatenates the learned features and feeds the data to the trained ensemble classification model (module 610) (block 760).

At block 770, system 300 formulates and outputs a list of prediction results which indicates components that are to be scheduled for maintenance (for example, whether a component will fail or not). For example, these components can include those that are expected to fail within a predetermined time span. In other examples, the components to be scheduled for maintenance can include those that are expected to fall below a predetermined level of performance (for example, speed, power consumption, efficiency, level of output, etc.) within the predetermined window.

According to example embodiments, the system 300 can identify a type of maintenance that is to be applied. For example, the system 300 can identify that a particular process is to be applied to the component, the component is to be replaced, recharged, or refueled, etc.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting failure components, comprising:
    performing, by a processor device, graph-based predictive maintenance (GBPM) to determine a trained ensemble classification model for detecting maintenance ready components that includes extracted node features and graph features;
    constructing, based on testing data and the trained ensemble classification model, an attributed temporal graph and the extracted node features and graph features;
    concatenating the extracted node features and graph features; and
    determining, based on the trained ensemble classification model, a list of prediction results of components that are to be scheduled for component maintenance;
    wherein the graph features include temporal graph features; and
    wherein the temporal graph features are selected from the group consisting of: in-degree from the attributed the temporal graph; total in-degree from the attributed temporal graph and at least one unknown component; out-degree from the attributed temporal graph; and total out-degree from attributed temporal graph and the at least one unknown component.

2. A method for detecting failure components, comprising:
    performing, by a processor device, graph-based predictive maintenance (GBPM) to determine a trained ensemble classification model for detecting maintenance ready components that includes extracted node features and graph features;
    constructing, based on testing data and the trained ensemble classification model, an attributed temporal graph and the extracted node features and graph features;
    concatenating the extracted node features and graph features; and
    determining, based on the trained ensemble classification model, a list of prediction results of components that are to be scheduled for component maintenance;
    wherein the graph features include temporal graph features; and
    wherein the temporal graph features include a dark web out-degree from unknown companies to existing component.

3. A method for detecting failure components, comprising:
    performing, by a processor device, graph-based predictive maintenance (GBPM) to determine a trained ensemble classification model for detecting maintenance ready components that includes extracted node features and graph features;
    constructing, based on testing data and the trained ensemble classification model, an attributed temporal graph and the extracted node features and graph features;
    concatenating the extracted node features and graph features; and
    determining, based on the trained ensemble classification model, a list of prediction results of components that are to be scheduled for component maintenance;
    wherein the graph features include temporal graph features; and
    wherein the temporal graph features are selected from the group consisting of:
    difference between total in-degree and total out-degree; and
    proportion between total in-degree and total out-degree.

4. A computer system for predicting system device failure, comprising:
    a processor device operatively coupled to a memory device, the processor device being configured to:
    perform graph-based predictive maintenance (GBPM) to determine a trained ensemble classification model for detecting maintenance ready components that includes extracted node features and graph features;
    construct, based on testing data and the trained ensemble classification model, an attributed temporal graph and the extracted node features and graph features;
    concatenate the extracted node features and graph features; and
    determine, based on the trained ensemble classification model, a list of prediction results of components that are to be scheduled for component maintenance;

wherein the graph features include temporal graph features; and wherein the temporal graph features are selected from the group consisting of:
  in-degree from the attributed the temporal graph;
  total in-degree from the attributed temporal graph and at least one unknown component;
  out-degree from the attributed temporal graph; and
  total out-degree from attributed temporal graph and the at least one unknown component.

5. A computer system for predicting system device failure, comprising:
  a processor device operatively coupled to a memory device, the processor device being configured to:
  perform graph-based predictive maintenance (GBPM) to determine a trained ensemble classification model for detecting maintenance ready components that includes extracted node features and graph features;
  construct, based on testing data and the trained ensemble classification model, an attributed temporal graph and the extracted node features and graph features;
  concatenate the extracted node features and graph features; and
  determine, based on the trained ensemble classification model, a list of prediction results of components that are to be scheduled for component maintenance;
  wherein the graph features include temporal graph features; and
  wherein the temporal graph features include a dark web out-degree from unknown companies to existing component.

6. A computer system for predicting system device failure, comprising:
  a processor device operatively coupled to a memory device, the processor device being configured to:
  perform graph-based predictive maintenance (GBPM) to determine a trained ensemble classification model for detecting maintenance ready components that includes extracted node features and graph features;
  construct, based on testing data and the trained ensemble classification model, an attributed temporal graph and the extracted node features and graph features;
  concatenate the extracted node features and graph features; and
  determine, based on the trained ensemble classification model, a list of prediction results of components that are to be scheduled for component maintenance;
  wherein the temporal graph features are selected from the group consisting of:
  difference between total in-degree and total out-degree; and proportion between total in-degree and total out-degree.

* * * * *